(12) United States Patent
Larsen

(10) Patent No.: US 9,330,367 B2
(45) Date of Patent: May 3, 2016

(54) FROZEN PRECIPITATION TREATMENT ANALYSIS SYSTEM

(71) Applicant: Louis Berman Company, Steubenville, OH (US)

(72) Inventor: Eric S. Larsen, Cortland, IL (US)

(73) Assignee: Swenson Spreader, LLC, Lindenwood, IL (US)

( * ) Notice: Subject to any disclaimer, the term of this patent is extended or adjusted under 35 U.S.C. 154(b) by 0 days.

(21) Appl. No.: 14/713,544

(22) Filed: May 15, 2015

(65) Prior Publication Data

US 2015/0248628 A1 Sep. 3, 2015

Related U.S. Application Data

(62) Division of application No. 14/037,938, filed on Sep. 26, 2013, now Pat. No. 9,096,979.

(60) Provisional application No. 61/706,151, filed on Sep. 27, 2012.

(51) Int. Cl.
| | |
|---|---|
| *G01M 17/00* | (2006.01) |
| *G06Q 10/06* | (2012.01) |
| *E01H 5/00* | (2006.01) |
| *E01H 5/04* | (2006.01) |
| *E01H 10/00* | (2006.01) |

(52) U.S. Cl.
CPC ............ *G06Q 10/06313* (2013.01); *E01H 5/00* (2013.01); *E01H 5/04* (2013.01); *E01H 10/007* (2013.01); *G06Q 10/06316* (2013.01)

(58) Field of Classification Search
CPC .................. G06Q 10/06313; G06Q 10/06316; E01H 5/00; E01H 5/04; E01H 10/007
See application file for complete search history.

(56) References Cited

U.S. PATENT DOCUMENTS

| | | | |
|---|---|---|---|
| 3,432,946 A | 3/1969 | Peitl | |
| 3,604,454 A | 9/1971 | Tomko et al. | |
| 3,706,144 A | 12/1972 | Miceli | |
| 4,353,177 A | 10/1982 | Hoekstra | |
| 5,361,519 A | 11/1994 | Ciula et al. | |
| 5,974,702 A * | 11/1999 | Donoghue | E01H 5/062 |
| | | | 172/819 |
| 6,163,985 A | 12/2000 | Chinnery et al. | |
| 6,256,909 B1 | 7/2001 | Kost | |
| 6,273,729 B1 | 8/2001 | Kelly | |

(Continued)

OTHER PUBLICATIONS http://www.ni.com/mobile/, Mobile Technology for Measurement and Control, National Instruments.

(Continued)

*Primary Examiner* — Calvin Cheung
(74) *Attorney, Agent, or Firm* — Roger D. Emerson; Timothy D. Bennett; Emerson Thomson Bennett

(57) ABSTRACT

A frozen precipitation treatment analysis system may include, in one embodiment, an electronic mobile device and a Global Positioning System (GPS). The mobile device may have software that uses the GPS and inputted information to produce a work flow plan for treating frozen precipitation at a site. In another embodiment, a frozen precipitation treatment analysis system may include an electronic mobile device and a virtual map of a site requiring frozen precipitation treatment analysis. The mobile device may have software that uses the virtual map and inputted information to determine the area of the site and/or other factors related to the frozen precipitation treatment analysis.

20 Claims, 5 Drawing Sheets

(56) References Cited

U.S. PATENT DOCUMENTS

| | | | |
|---|---|---|---|
| RE38,665 E * | 12/2004 | Struck | E01H 5/06 180/167 |
| 6,978,952 B2 | 12/2005 | Kost et al. | |
| 7,591,087 B2 | 9/2009 | Kost et al. | |
| 7,631,442 B2 | 12/2009 | Kost et al. | |
| 7,661,211 B2 | 2/2010 | Potak | |
| 7,918,042 B2 | 4/2011 | Ropog | |
| 8,185,276 B2 | 5/2012 | Buckbee et al. | |
| 8,251,569 B2 * | 8/2012 | Hildreth | B01F 1/0016 137/88 |
| 8,453,358 B2 | 6/2013 | Ropog | |
| 8,505,837 B2 | 8/2013 | Warchola | |
| 8,505,838 B2 | 8/2013 | Schaefer et al. | |
| 8,523,086 B2 | 9/2013 | Warchola | |
| 8,902,081 B2 | 12/2014 | Groeneweg | |
| 9,194,091 B2 * | 11/2015 | Moon, Jr. | E01H 5/06 |
| 2004/0098227 A1 * | 5/2004 | Struck | G01G 19/10 702/183 |
| 2004/0195357 A1 * | 10/2004 | Doherty | A01C 17/00 239/172 |
| 2007/0056191 A1 | 3/2007 | Hoerle et al. | |
| 2007/0207053 A1 | 9/2007 | Doyle et al. | |
| 2007/0277403 A1 * | 12/2007 | Summer | E01H 5/00 37/234 |
| 2008/0073090 A1 * | 3/2008 | Harris | E01H 5/06 172/275 |
| 2009/0309779 A1 * | 12/2009 | Buckbee | E01C 19/20 341/176 |
| 2010/0095558 A1 | 4/2010 | Campbell | |
| 2011/0022277 A1 * | 1/2011 | Pugh | E01H 5/06 701/50 |
| 2012/0140117 A1 | 6/2012 | Waites | |
| 2012/0180347 A1 * | 7/2012 | Andic | E01H 5/06 37/280 |
| 2013/0080052 A1 | 3/2013 | Gooding | |
| 2013/0197977 A1 * | 8/2013 | Mewes | G06Q 10/0639 705/7.38 |
| 2013/0300589 A1 * | 11/2013 | Rennie | G08G 1/017 340/990 |
| 2014/0064826 A1 * | 3/2014 | Clifford | E01H 5/061 403/53 |
| 2015/0039361 A1 | 2/2015 | Crowther et al. | |

OTHER PUBLICATIONS http://www.crestron.com/resources/product_and_programming_resources/catalogs_and_brochures/online_catalog/default.asp?jump+1&model+CRESTRON-MOBILE-PRO, Crestron Mobile Pro, Crestron.

James W. Quigley, Mobile Apps to Deal With the Snow-Snow Plw, Snow Removal Apps Added to Canvas Application Store, Feb. 11, 2011, http://www.gocanvas.com/content/blog/post/mobile-apps-to-deal-with-the-snow-snow-plow-snow-removal-apps-added-to-canv.

http://itunes.apple.com/us/app/morton-salt-pro/id453682978?mt=8, iTunes, Morton Salt Pro, INTERSOG.

https://play.google.com/store/apps/details?id=org.mortonsalt042&feature=search_result, Google Play, Morton Salt Pro, INTERSOG.

* cited by examiner

FROZEN PRECIPITATION TREATMENT ANALYSIS SYSTEM

This application is a divisional of U.S. patent application Ser. No. 14/037,938 filed Sep. 26, 2013, entitled SOFTWARE APPLICATION THAT ALLOWS A USER TO UTILIZE A MOBILE DEVICE TO CONTROL FROZEN PRECIPITATION TREATMENT SYSTEMS, which claims the benefit of U.S. Provisional Patent Application No. 61/706,151 filed Sep. 27, 2012, entitled SOFTWARE APPLICATION THAT ALLOWS A USER TO UTILIZE A MOBILE DEVICE TO CONTROL SNOW AND ICE CONTROL EQUIPMENT, the contents of which are incorporated herein by reference.

I. BACKGROUND OF THE INVENTION

A. Field of Invention

This invention pertains to the art of frozen precipitation treatment and more specifically to methods and apparatuses of doing frozen precipitation treatment analysis at sites using an electronic mobile device.

B. Description of the Related Art

Frozen precipitation, such as snow and ice, accumulate on roadways tending to make the roadways slippery. It is thus desirable to remove or prevent accumulation of the frozen precipitation. Various means are used to accomplish this, examples of which include, but are not limited to, plows, granular spreaders, pre-wet applications, and anti-ice applications. The ice or snow control equipment used to remove or prevent such accumulation is currently most often controlled by remote wired or wireless controllers.

II. SUMMARY

According to one embodiment of this invention, a frozen precipitation treatment analysis system may be used at one or more associated sites and comprises: an electronic mobile device that comprises: software related to frozen precipitation treatment; input controls that are manipulatable by an associated user to input into the electronic mobile device information related to frozen precipitation treatment at the one or more associated sites; and, at least one of: (A)(1) a Global Positioning System (GPS); and, (2) wherein the software combines the GPS and inputted information from the associated user concerning a plurality of the associated sites to produce a work flow plan, indicated on the electronic mobile device, that suggests an order in which the plurality of associated sites could be worked to treat frozen precipitation; and, (B)(1) one or more virtual maps of the one or more associated sites; and, (2) wherein the software combines the one or more virtual maps and the inputted information from the associated user to do at least one of: (a) determine the area of the one or more associated sites; (b) estimate the cost required to treat frozen precipitation at the one or more associated sites; (c) estimate the time required to treat frozen precipitation at the one or more associated sites; and, (d) estimate the frozen precipitation treatment mechanisms required to treat frozen precipitation at the one or more associated sites.

According to another embodiment of this invention, a frozen precipitation treatment analysis system may be used at one or more associated sites comprises: an electronic mobile device that comprises: software related to frozen precipitation treatment; input controls that are manipulatable by an associated user to input into the electronic mobile device information related to frozen precipitation treatment at the one or more associated sites; one or more virtual maps of the one or more associated sites; and, wherein the software combines the one or more virtual maps and the inputted information from the associated user to: (a) determine the area of the one or more associated sites; (b) estimate the cost required to treat frozen precipitation at the one or more associated sites; and, (c) estimate the time required to treat frozen precipitation at the one or more associated sites.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

IV. DETAILED DESCRIPTION OF THE INVENTION

Figure 1:
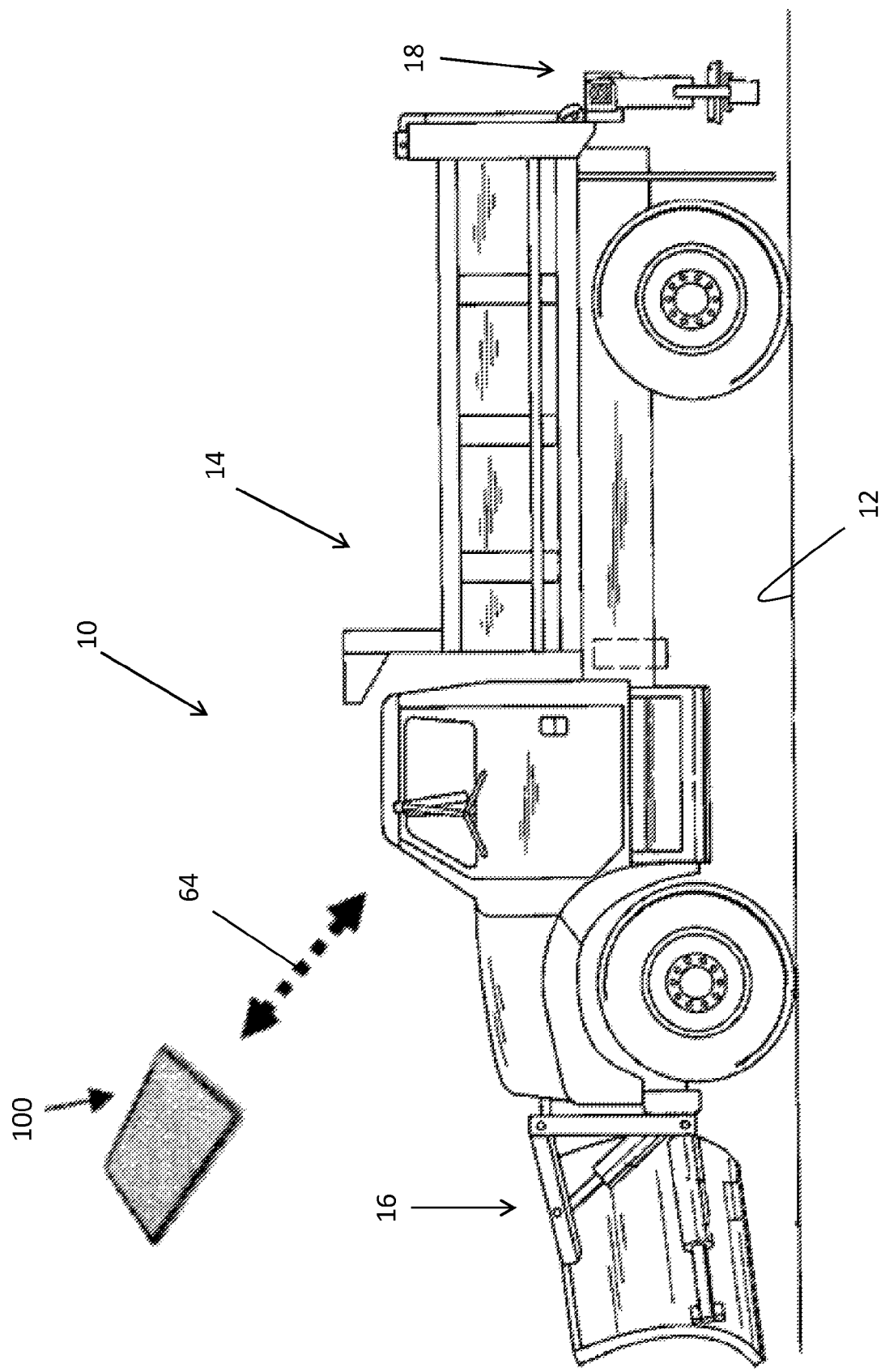
FIG. 1 is a side view of a vehicle equipped with two frozen precipitation treatment assemblies, a snow plow and a spreader, which may be controlled by an electronic mobile device according to some embodiments of this invention.

Referring now to the drawings wherein the showings are for purposes of illustrating embodiments of the invention only and not for purposes of limiting the same, and wherein like reference numerals are understood to refer to like components, FIG. 1 shows a frozen precipitation treatment system 10 that may be used to treat a ground surface 12 and that may include an electronic mobile device 100 according so some embodiments of this invention. The ground surface 12 can be any that requires treatment for frozen precipitation such as roadways, parking lots and sidewalks though other ground surfaces may also work with this invention. By "frozen precipitation" it is meant snow, ice, sleet, hail, rain and other fluids that freeze or may freeze and the like. By "frozen precipitation treatment system" it is meant any device or combination of devices that are used to treat frozen precipitation. By "treat" it is meant to remove frozen precipitation and/or to prevent its accumulation. In FIG. 1 the frozen precipitation treatment system 10 includes a vehicle 14 in the form of a truck. In other embodiments, other vehicles may be used such as, but not limited to, a car, an all-terrain vehicle (ATV) and a tractor. This invention may also have applications without the use of a vehicle.

Still referring to FIG. 1, when used, the vehicle 14 may support one or more frozen precipitation treatment assemblies that are operable to remove or prevent the accumulation of frozen precipitation on the ground surface 12. In one embodiment, shown, a frozen precipitation treatment assembly may be a snow plow 16. In another embodiment, also shown, a frozen precipitation treatment assembly may be a spreader 18. In yet other embodiments, the frozen precipitation treatment assembly may be an under body scraper, a plow wing, a dump body, pre-wet equipment or an anti-icer. This invention will work with any frozen precipitation treatment assembly chosen with the sound judgment of a person of skill in the art.

Figure 2:
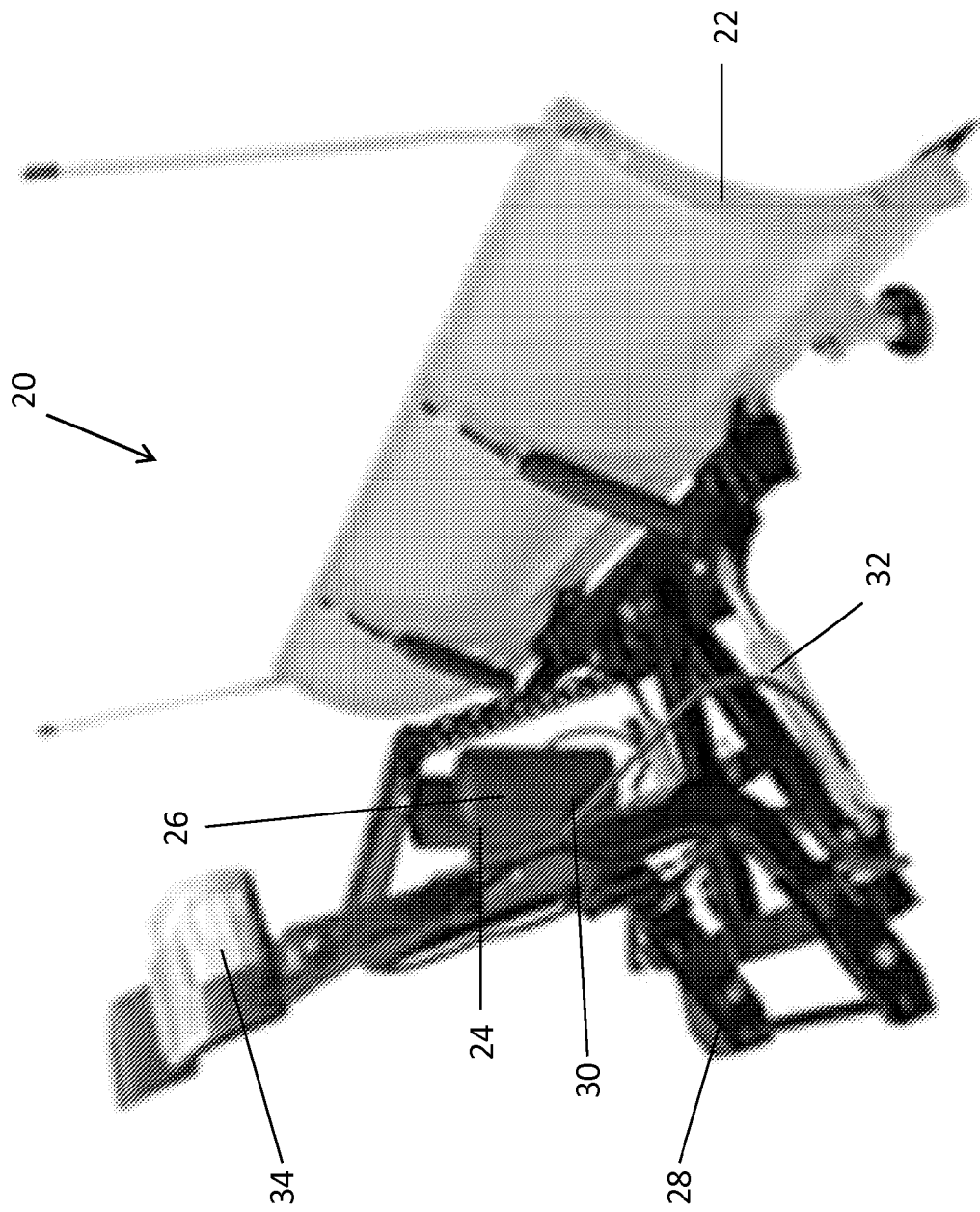
FIG. 2 is a perspective view of a snow plow.

With reference now to FIG. 2, snow plow 20 may be a frozen precipitation treatment assembly used with this invention. The snow plow 20 may include a frozen precipitation treatment mechanism in the form of a blade 22 that is operable to remove the accumulation of snow or ice from a ground surface in a manner well known to those of skill in the art. The snow plow 20 may also include an electronic controller 24 that operates the blade 22 and a receiver 26 that receives electric control signals and communicates them to the electronic controller 24 to operate the blade 22. The receiver 26 may be positioned within a housing separate from the electronic controller 24 or may, as shown, be positioned within the same housing as the electronic controller 24. The snow plow 20 may also have an attachment mechanism 28 to mount or attach the snow plow 20 to a vehicle in any known manner, such as to vehicle 14 shown in FIG. 1. The snow plow 20 may have any number of components well known to those of skill in the art. The snow plow 20 may, for example, have a hydraulic mechanism 30 that is used to adjust the position of the blade 22 such as with hydraulic cylinders 32. While the blade 22 shown can be adjusted to pivot about a vertical axis and can be raised and lowered between non-use and used positions, it should be understood that an adjustment of such a blade, including blade wings, will work well with this invention. The snow plow 20 may having a lighting system 34 used to light the ground surface that is treated as is well known to those of skill in the art.

The components used with a snow plow, such as but not limited to snow plow 16 in FIG. 1 and snow plow 20 in FIG. 2, and an electronic mobile device 100, shown schematically in FIG. 1, according to this invention are not limited to those described above. Thus, the following US Patents are incorporated herein by reference in their entirety: U.S. Pat. No. 8,453,358 titled DUAL COMPRESSION SPRING RAM, U.S. Pat. No. 7,918,042 titled THREE POSITION WING FOR SNOWPLOW, U.S. Pat. No. 7,661,211 titled METHOD AND APPARATUS FOR RAISING A SNOW PLOW, U.S. Pat. No. 7,631,442 titled MODULAR HYDRAULIC POWER MECHANISM, U.S. Pat. No. 7,591,087 titled FLOW DIVIDER FOR SNOWPLOW WINGS, U.S. Pat. No. 6,273,729 titled LIGHT HARNESS CONNECTOR, U.S. Pat. No. 6,256,909 titled ONE PLUG SYSTEM FOR A SNOWPLOW, U.S. Pat. No. 6,163,985 titled SYSTEM FOR CONTROLLING A SNOWPLOW AND OTHER VEHICLE ACCESSORIES, U.S. Pat. No. 5,361,519 titled CONTROL PAD FOR A SNOWPLOW, U.S. Pat. No. 4,353,177 titled CONTROL FOR SNOWPLOW BLADE, U.S. Pat. No. 3,706,144 titled CONTROL MEANS FOR A SNOW PLOW, U.S. Pat. No. 3,604,454 titled HYDRAULIC AND ELECTRIC CONTROL DEVICE and, U.S. Pat. No. 3,432,946 titled LIFTING AND PRESSURE UNIT FOR SNOWPLOWS AND THE LIKE.

Figure 3:
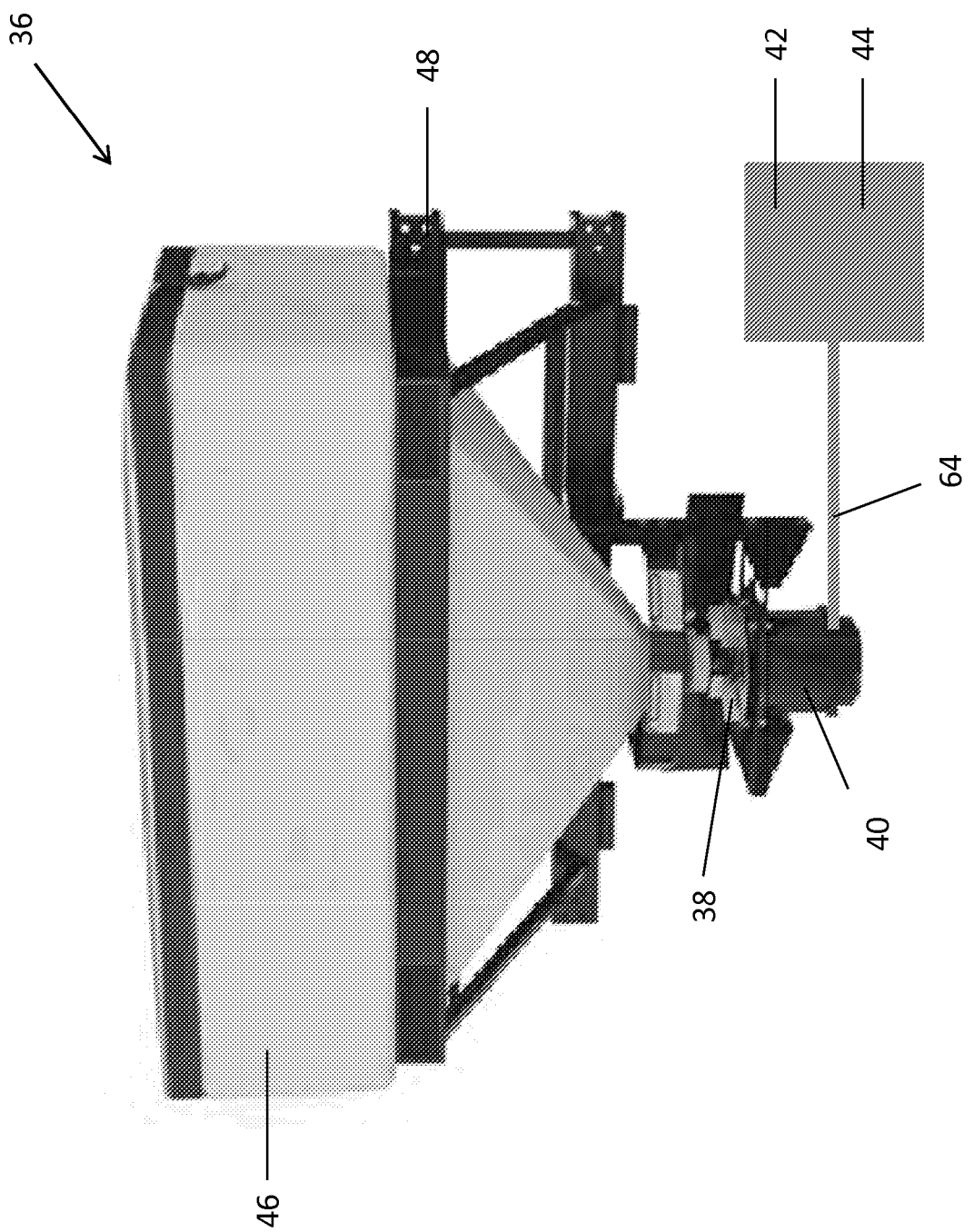
FIG. 3 is a back view of a spreader.

With reference now to FIG. 3, spreader 36 may be a frozen precipitation treatment assembly used with this invention. The spreader 36 may include a frozen precipitation treatment mechanism in the form of a spinner plate 38 that is rotatable by a motor 40 to spread or apply a substance, such as salt or sand, onto a ground surface to melt snow and ice from the ground surface as is well known. The spreader 36 may also include an electronic controller 42, shown schematically, that operates the motor 40 and a receiver 44 that receives electric control signals and communicates them to the electronic controller 42 to operate/rotate the spinner plate 38. The receiver 44 may be positioned within a housing separate from the electronic controller 42 or may, as shown, be positioned within the same housing as the electronic controller 42. The spreader 36 may also have a hopper 46 that holds the substance that is spread and an attachment mechanism 48 to mount the spreader 36 to a vehicle in any known manner, such as to vehicle 14 shown in FIG. 1.

The components used with a spreader, such as but not limited to spreader 18 shown in FIG. 1 and spreader 36 shown in FIG. 3, and an electronic mobile device 100, shown schematically in FIG. 1, according to this invention are not limited to those described above. Thus, the following US Patents are incorporated herein by reference in their entirety: U.S. Pat. No. 8,523,086 titled METHOD AND APPARATUS FOR STOPPING A SPREADER, U.S. Pat. No. 8,505,838 titled ELECTRIC INTERLOCK FOR SPREADER, U.S. Pat. No. 8,505,837 titled TAILGATE SPREADER HOPPER FILL STATUS SENSOR and, U.S. Pat. No. 6,978,952 titled SAND/SALT SPREADER.

Figure 4:
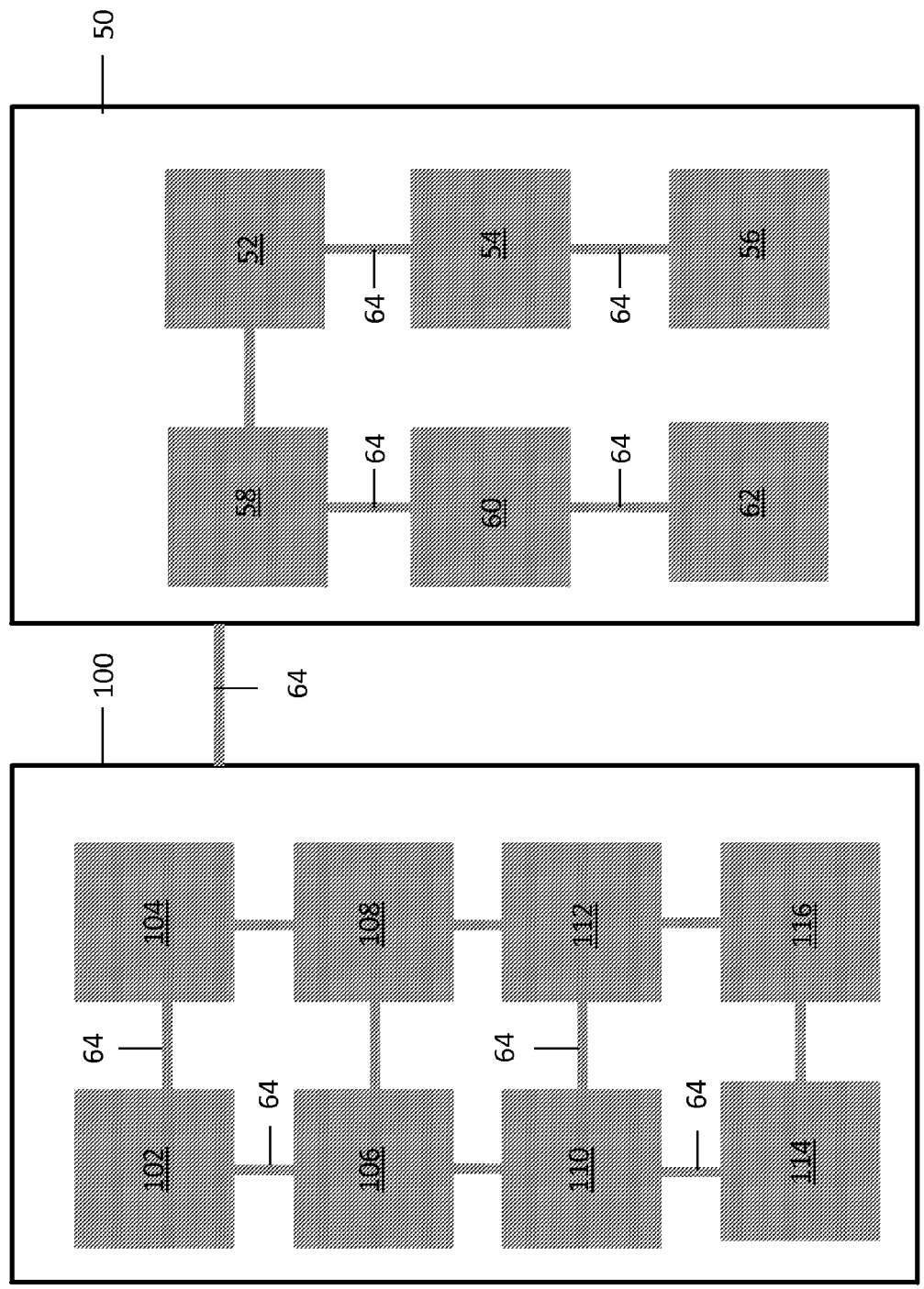
FIG. 4 is a block diagram of a frozen precipitation treatment assembly and an electronic mobile device according to some embodiments of this invention.

A frozen precipitation treatment assembly 50 is shown schematically in FIG. 4. The frozen precipitation treatment assembly(ies) 50 used with this invention may be any suitable frozen precipitation treatment assembly, as discussed above. The frozen precipitation treatment assembly 50 may include a frozen precipitation treatment mechanism 52, such as a snow plow blade or spreader spinner plate, that is operable to remove or prevent the accumulation of frozen precipitation on a ground surface. The frozen precipitation treatment assembly 50 may also include an electronic controller 54 that operates the frozen precipitation treatment mechanism 52 and a receiver 56 that receives electric control signals and communicates them to the electronic controller 54 to operate the frozen precipitation treatment mechanism 52. In some embodiments, the frozen precipitation treatment assembly 50 may include at least one component 58 that has a measurable characteristic, a sensor 60 that senses the measurable characteristic and, an electronic measure signal generator 62 that generates and sends an electric measure signal to the electronic mobile device 100 based on the measurable characteristic sensed by the sensor 60. The electronic mobile device 100 may also indicate to the user the measurable characteristic based on the electric measure signal and in this way perform diagnostic functions.

With continuing reference to FIG. 4, the particular component 58 and sensor 60 can be any chosen with the sound judgment of a person of skill in the art. The component 58 may be, for example, a hydraulic mechanism, such as hydraulic mechanism 30 described above and shown in FIG. 2, which is used to operate a snow plow. The characteristic that is measured may be the pressure of the hydraulic fluid and the sensor 60 may be a pressure sensor. In another embodiment, the component 58 may be a motor, such as motor 40 described above and shown in FIG. 3, which is used to operate a spreader spinner plate. The characteristic that is measured may be the current draw of the motor and the sensor 60 may be an amp meter. In yet another embodiment, the component 58 may be a lighting system, such as lighting system 34 described above and shown in FIG. 2, which is used to illuminate a ground surface. The characteristic that is measured may be the current draw of the lights and the sensor 60 may be an amp meter. Communication means 64 may be used so that the various components can communicate with each other. The communication means 64 can be any chosen with the sound judgment of a person of skill in the art such as, but not limited to, wiring, wireless communications, piping, physical contact, etc.

With reference now to FIGS. 1 and 4, the electronic mobile device 100 of this invention may be of any type chosen by a person of skill in the art. An electronic mobile device, as is well known by those of skill in the art, is a relatively small, handheld computing device. Some non-limiting examples of an electronic mobile device include a cellular telephone, an iPad, an iPhone, an Android device, a Kindle, a Nook, a Bluetooth device, a Wi-Fi device, a laptop, and a touchpad. The electronic mobile device 100 may be positioned in any location suitable for the user to communicate via communication means 64. It may, for example, be positioned within the vehicle 14 or in another vehicle, or in any location close enough to operate the corresponding frozen precipitation treatment assembly 50. The electronic mobile device 100 may include an operating system 102 and/or software/applications 104 that controls the frozen precipitation treatment mechanism 52, input controls 106 that are manipulatable by a user to use the software 104 and, an electronic control signal generator 108 that generates and sends the electric control signals to the receiver 56 based on the associated user's manipulation of the input controls. The input controls 106 may be of any type chosen with the sound judgment of a person of skill in the art. The input controls 106 may include a display screen 110 and/or a miniature keyboard 112. In one embodiment, the input controls 106 may comprise at least one voice activated control 114 that enables the user to input data with his/her voice. In another embodiment, the input controls 106 may include a tactile feedback device 116 device that provides tactile feedback to the user as the user manipulates the input controls 106. In another embodiment, at least a portion of the input controls 106 may be displayed on or within the vehicle other than on or within the electronic mobile device 100. This display may be, for example, on the vehicle's windshield. The electronic mobile device 100 is operated by the user to control one or more components of the frozen precipitation treatment assembly 50.

Figure 5:
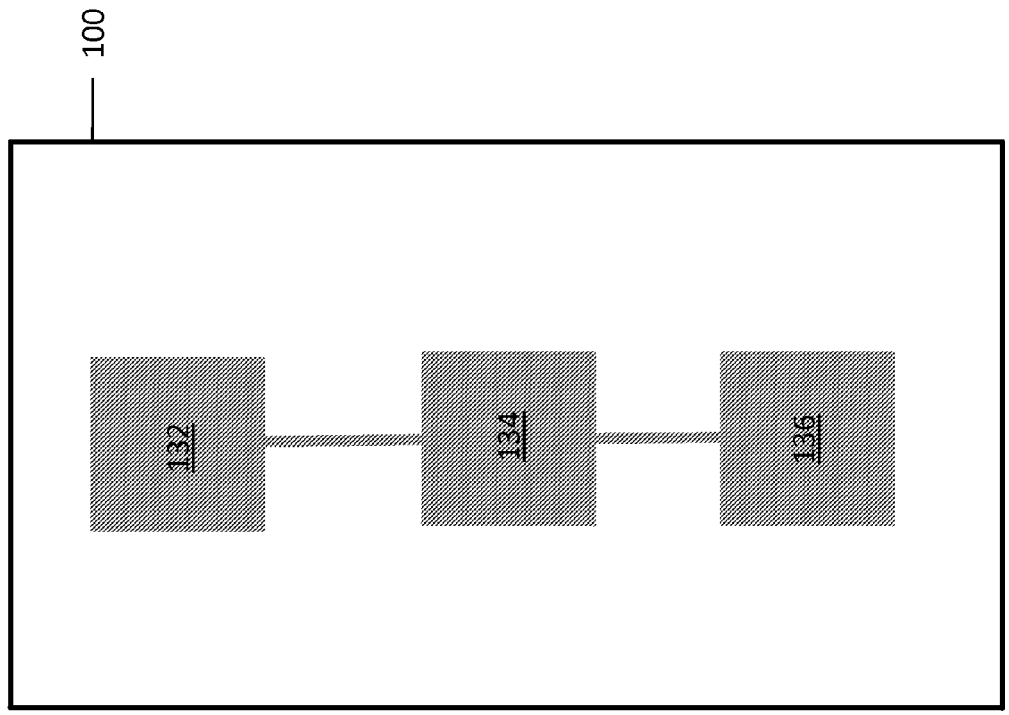
FIG. 5 is a block diagram of an electronic mobile device according to other embodiments of this invention.

With reference now to FIG. 5, in another embodiment the electronic mobile device 100 may include a Global Positioning System (GPS) 118 that, as known to those of skill in the art, provides location and time information. The electronic mobile device 100 may also include software that uses the GPS 118 in a manner related to treating frozen precipitation. In one embodiment, the electronic mobile device 100 may include software 120 that tracks information related to the operation of the frozen precipitation treatment mechanism 52 and software 122 that combines the GPS 118 and the information related to the operation of the frozen precipitation treatment mechanism 52 to analyze operation characteristics of the frozen precipitation treatment mechanism 52. In one specific embodiment, the software 120 may track the amount of time the snow plow blade 22 (see FIG. 2) is on the ground and the software 122 may combine the time the snow plow blade 22 is on the ground with the GPS 118 to determine how much of the ground surface was plowed. In another specific embodiment, the software 120 may track the amount of time the spreader spinner plate 38 (see FIG. 3) is rotated and the software 122 may combine the time the spreader spinner plate 38 is rotated with the GPS 118 to determine how much of the ground surface was coated with salt. In yet another specific embodiment, the software 120 may track the amount of salt in the spreader hopper 46 (see FIG. 3) and the software 122 may combine the time the amount of salt with the GPS 118 to determine how much salt was spread over a given area of ground surface.

Still referring to FIG. 5, in another embodiment the electronic mobile device 100 may include software 124 that combines the GPS 118 and inputted information from the user concerning work site locations to produce a work flow plan. The user may input the addresses of five separate work sites, for example, into the electronic mobile device 100 and the software 124 may combine the inputted data with the GPS 118 to suggest an order in which the work sites could most conveniently be worked. This order may then be indicated on the electronic mobile device 100. In yet another embodiment, the electronic mobile device 100 may include software 126 that uses information from the GPS 118 to determine the ground speed of the vehicle, software 128 that controls the frozen precipitation treatment mechanism 52 (see FIG. 4) based on the ground speed of the vehicle; and, an electronic control signal generator 130 that generates and sends the electric control signals to the receiver 56 based on the software 128 that controls the frozen precipitation treatment mechanism 52. In one specific embodiment, the software 128 may control the spreader 36 (see FIG. 3) to release more (or less) salt based on the speed of the vehicle carrying the spreader 36.

Figure 6:
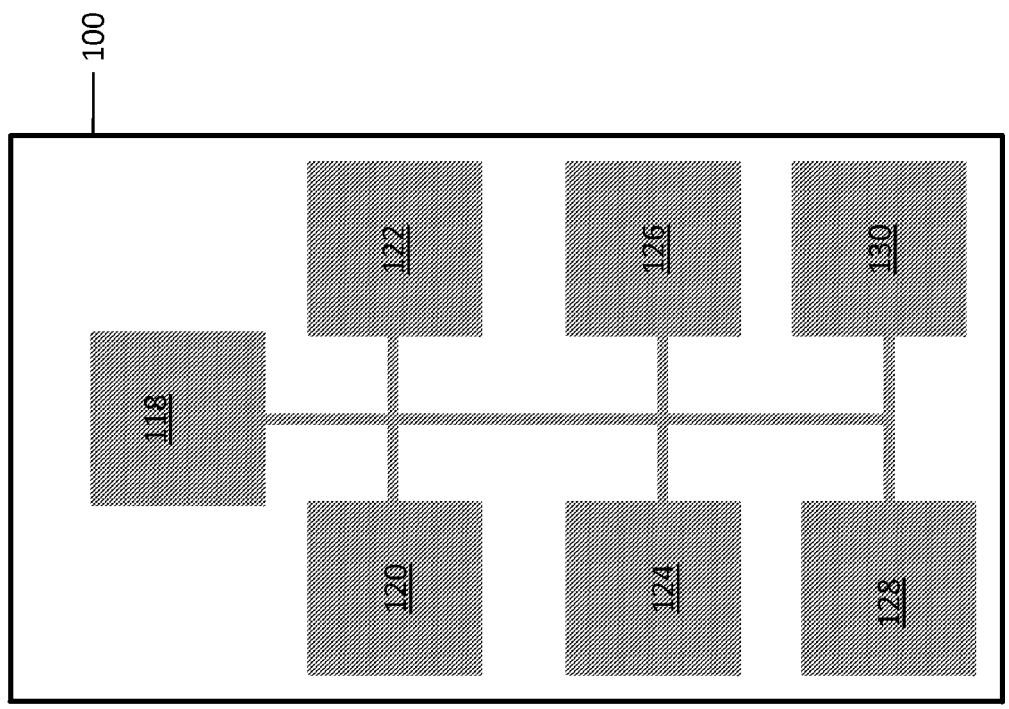
FIG. 6 is a block diagram of an electronic mobile device according to yet other embodiments of this invention.

With reference now to FIG. 6, in another embodiment the electronic mobile device 100 may be used in a frozen precipitation treatment analysis system for use at a site where a ground surface is to be treated for frozen precipitation. In one embodiment, the electronic mobile device 100 may include a virtual map 132 of the site, input controls 134 that are manipulatable by a user to input into the electronic mobile device 100 information related to frozen precipitation treatment at the site and, software 136 that combines the virtual map 132 and the inputted information to produce an estimate of at least one resource required to treat frozen precipitation at the site. Inputted information may include areas that cannot be treated such as light poles, garden areas or grassy areas. In one embodiment, the software 136 determines the area of the site. In another embodiment, the software 136 estimates the cost required to treat frozen precipitation at the site. In yet another embodiment, the software 136 estimates the time required to treat frozen precipitation at the site. In still another embodiment, the software 136 estimates the frozen precipitation treatment mechanism(s) 52 required to treat frozen precipitation at the site.

Numerous embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

I claim:

1. A frozen precipitation treatment analysis system for use at one or more associated sites comprising:
    an electronic mobile device that comprises:
        software related to frozen precipitation treatment;
        input controls that are manipulatable by an associated user to input into the electronic mobile device information related to frozen precipitation treatment at the one or more associated sites; and,
        at least one of:
        (A) (1) a Global Positioning System (GPS); and,
            (2) wherein the software combines the GPS and inputted information from the associated user concerning a plurality of the associated sites to produce a work flow plan, indicated on the electronic mobile device, that suggests an order in which the plurality of associated sites could be worked to treat frozen precipitation; and,
        (B) (1) one or more virtual maps of the one or more associated sites; and,
            (2) wherein the software combines the one or more virtual maps and the inputted information from the associated user to do at least one of:
                (a) determine the area of the one or more associated sites;

(b) estimate the cost required to treat frozen precipitation at the one or more associated sites;

(c) estimate the time required to treat frozen precipitation at the one or more associated sites; and, (d) estimate the frozen precipitation treatment mechanisms required to treat frozen precipitation at the one or more associated sites.

2. The frozen precipitation treatment analysis system of claim 1 wherein the electronic mobile device comprises:

a Global Positioning System (GPS); and, wherein the software combines the GPS and inputted information from the associated user concerning a plurality of the associated sites to produce a work flow plan, indicated on the electronic mobile device, that suggests an order in which the plurality of associated sites could be worked to treat frozen precipitation.

3. The frozen precipitation treatment analysis system of claim 2 wherein the suggested order is an order in which the plurality of associated sites could be treated by one or more snow plows.

4. The frozen precipitation treatment analysis system of claim 2 wherein the suggested order is an order in which the plurality of associated sites could be treated by one or more spreaders.

5. The frozen precipitation treatment analysis system of claim 1 wherein the electronic mobile device comprises:

one or more virtual maps of the one or more associated sites; and, wherein the software combines the one or more virtual maps and the inputted information from the associated user to do at least one of:

(a) determine the area of the one or more associated sites;

(b) estimate the cost required to treat frozen precipitation at the one or more associated sites;

(c) estimate the time required to treat frozen precipitation at the one or more associated sites; and, (d) estimate the frozen precipitation treatment mechanisms required to treat frozen precipitation at the one or more associated sites.

6. The frozen precipitation treatment analysis system of claim 5 wherein the inputted information includes one or more areas at the one or more associated sites that cannot be treated.

7. The frozen precipitation treatment analysis system of claim 5 wherein the software combines the one or more virtual maps and the inputted information from the associated user to determine the area of the one or more associated sites.

8. The frozen precipitation treatment analysis system of claim 5 wherein the software combines the one or more virtual maps and the inputted information from the associated user to estimate the cost required to treat frozen precipitation at the one or more associated sites.

9. The frozen precipitation treatment analysis system of claim 5 wherein the software combines the one or more virtual maps and the inputted information from the associated user to estimate the time required to treat frozen precipitation at the one or more associated sites.

10. The frozen precipitation treatment analysis system of claim 5 wherein the software combines the one or more virtual maps and the inputted information from the associated user to estimate the frozen precipitation treatment mechanisms required to treat frozen precipitation at the one or more associated sites.

11. The frozen precipitation treatment analysis system of claim 1 wherein the software can control an associated frozen precipitation treatment mechanism.

12. The frozen precipitation treatment analysis system of claim 1 wherein the input controls comprise at least one voice activated control.

13. The frozen precipitation treatment analysis system of claim 1 wherein the input controls comprises a tactile feedback device that provides tactile feedback to the associated user as the associated user manipulates the input controls.

14. A frozen precipitation treatment analysis system for use at one or more associated sites comprising:

an electronic mobile device that comprises:

software related to frozen precipitation treatment;

input controls that are manipulatable by an associated user to input into the electronic mobile device information related to frozen precipitation treatment at the one or more associated sites;

one or more virtual maps of the one or more associated sites; and, wherein the software combines the one or more virtual maps and the inputted information from the associated user to:

(a) determine the area of the one or more associated sites;

(b) estimate the cost required to treat frozen precipitation at the one or more associated sites; and, (c) estimate the time required to treat frozen precipitation at the one or more associated sites.

15. The frozen precipitation treatment analysis system of claim 14 wherein the software combines the one or more virtual maps and the inputted information from the associated user to estimate the frozen precipitation treatment mechanisms required to treat frozen precipitation at the one or more associated sites.

16. The frozen precipitation treatment analysis system of claim 14 wherein the inputted information includes one or more areas at the one or more associated sites that cannot be treated.

17. The frozen precipitation treatment analysis system of claim 14 wherein the software can control an associated frozen precipitation treatment mechanism.

18. The frozen precipitation treatment analysis system of claim 14 wherein the input controls comprise at least one voice activated control.

19. The frozen precipitation treatment analysis system of claim 14 wherein the input controls comprises a tactile feedback device that provides tactile feedback to the associated user as the associated user manipulates the input controls.

20. A frozen precipitation treatment apparatus comprising:

at least one frozen precipitation treatment assembly that is supportable to an associated vehicle and that comprises:

(1) a frozen precipitation treatment mechanism that is operable to remove or prevent the accumulation of frozen precipitation on an associated ground surface;

(2) at least one component that has a measurable characteristic;

(3) a sensor that senses the measurable characteristic; and, (4) an electronic measure signal generator that generates and sends an electric measure signal based on the measurable characteristic sensed by the sensor; and, an electronic mobile device that:
  (1) receives the electric measure signal; and,
  (2) indicates to an associated user the measurable characteristic based on the electric measure signal.

* * * * *